Sept. 9, 1969 R. K. ROSE 3,465,775

TEMPERATURE-INSENSITIVE FLUID CONTROL CIRCUITS AND FLUERIC DEVICES

Filed Nov. 24, 1967

Inventor
ROBERT K. ROSE

ATTORNEY

United States Patent Office 3,465,775

Patented Sept. 9, 1969

3,465,775

TEMPERATURE-INSENSITIVE FLUID CONTROL CIRCUITS AND FLUERIC DEVICES

Robert K. Rose, Burnt Hills, N.Y., assignor to General Electric Company, a corporation of New York Filed Nov. 24, 1967, Ser. No. 685,552
Int. Cl. F15c *1/08, 1/12, 1/14*
U.S. Cl. 137—81.5 5 Claims

ABSTRACT OF THE DISCLOSURE

The disclosure shows a control circuit for maintaining a constant output from a fluidic signal generator. The signal generator provides an input to a flueric resonator, comprising a chamber having an open-ended tube projecting therefrom and a plurality of open-ended capillary tubes, also projecting therefrom. An output derived from the resonator is fed to phase-discriminator means which also have an input from the signal generator. When the signal generator is not operating at the resonant frequency of the resonator, an output from the phase-discriminator means is employed to change the speed of the mechanical input to the signal generator to change the frequency of the pressure variations of the signal generator to match the resonant frequency of the resonator. The capillary tubes are sized to maintain the resonant frequency of the resonator substantially constant over at least a given temperature range so that the frequency of the signal from the signal generator is likewise maintained constant.

The present invention relates to improvements in fluidic control circuits for maintaining a desired rate of operation in an environment having a varying temperature and more particularly to improvements in flueric devices which are capable of providing a temperature-insensitive reference for a desired rate of pressure fluctuation of a fluid signal.

Fluidic control circuits provide many advantages, as, for example, a capability of operation at elevated temperatures. There have been many such control circuits which have operated satisfactorily in at least some aspects. However, serious problems have been encountered in maintaining a fixed output, as in a speed control loop, where there are substantial changes in the environmental temperature of the control circuit. One type of control circuit employs a flueric resonator to provide a reference signal for attaining the control function. The temperature sensitivity of this resonator points up a further deficiency of present flueric and fluidic devices, namely, the need for a simple and effective flueric device for providing a temperature-insensitive, constant reference source for establishing a desired frequency of the rate of fluctuation of a fluid pressure signal.

To more specifically describe the problems encountered in obtaining a temperature-insensitive signal reference, such resonators comprise a relatively large chamber or volume, having an open-ended tube projecting therefrom. The size of such volume, in combination with the dimensions of the tube, establish a natural resonant frequency for the resonator. Thus, when there is an input fluid signal to the volume or chamber which is at this resonant frequency, there will be an alternate expansion and compression of the fluid in the chamber which has a maximum magnitude, and the consequent increases and decreases of pressurization within the chamber will be in phase with the corresponding fluctuations in pressure of the input signal. Such a resonator enables an output signal to be derived therefrom which indicates that the frequency of the variations of the input signal is at a given level, namely, the resonant frequency of the resonator. If the input signal is above or below the resonant signal, the output signal will be reduced in magnitude and its phase relationship relative to the input signal will be changed. The character of the output signal can then be used in many ways, as for example, to change the frequency of the input signal so that it matches the reference value established by the resonator.

This provides a reliable accurate reference for a given temperature. However, when the temperature of the fluid in the resonator changes, there is also a change in the reference value establishd by the resonant frequency of the resonator.

One object of the invention is to provide an improved, simplified fluidic control circuit which maintains a fixed output when operating in an environment of varying temperature.

Another object of the invention is to provide an improved flueric resonator having at least an essentially constant resonant frequency over a substantial variation in the temperature range of its operating fluid.

These ends are attained by providing a resonator of the character described above, having in addition open-ended, compensating tube means projecting from the resonator chamber. The effect of the relatively small compensating tube means is to maintain the resonant frequency of the resonator at a substanial consant value throughout a relatively wide predetermined temperature range. These tube means are preferably in the form of a plurality of capillary tubes.

This improved resonator can then be employed in combination with fluid signal-generating means to provide a reference which is compared with the generated signal to, in turn, provide a control mode for maintaining a circuit output constant, regardless of temperature changes in its operating environment.

The above and other related objects and features of the invention will be apparent from a reading of the following description of the disclosure found in the accompanying drawing and the novelty thereof pointed out in the appended claims.

Figure 1:
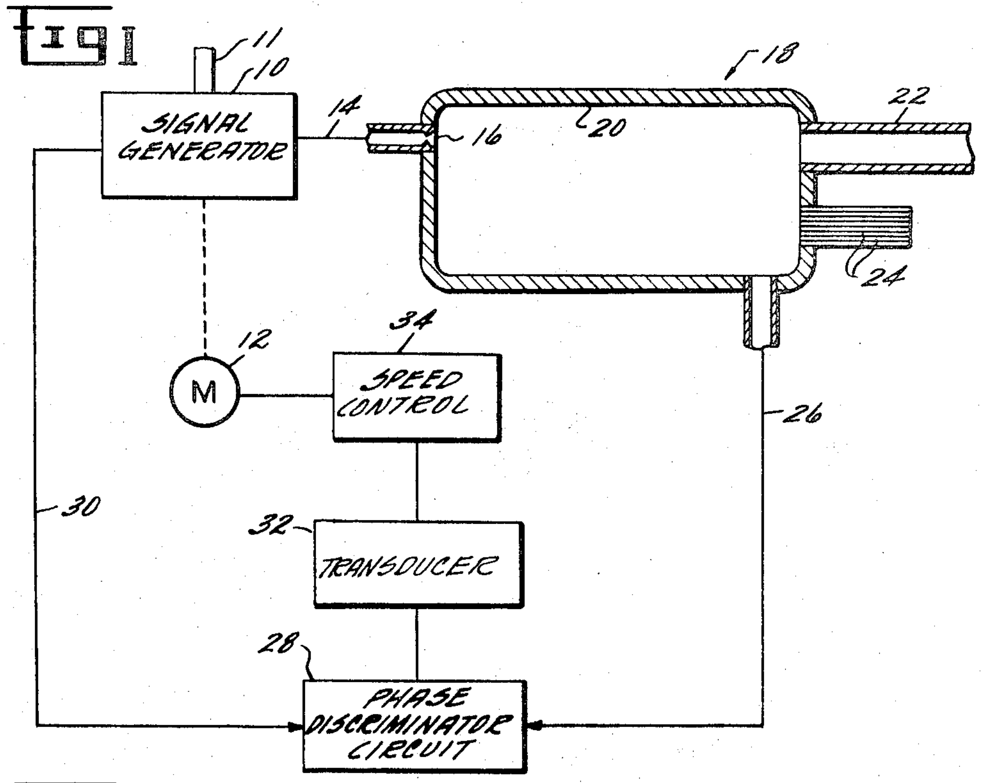
FIGURE 1 illustrates a resonator embodying the present invention, incorporated into a control system for a signal generator.
Figure 2:
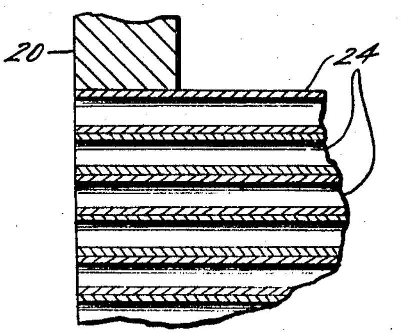
FIGURE 2 is a fragmentary view of a portion of the resonator seen in FIGURE 1, on an enlarged scale.
Figure 3:
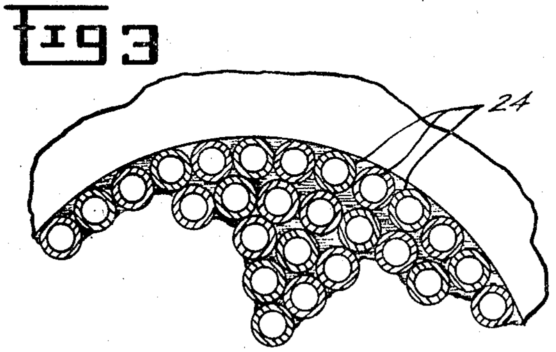
FIGURE 3 is a fragmentary section, taken on line III—III in FIGURE 2.

The fluidic system seen in FIGURE 1 comprises a fluidic signal generator 10, having, at 11, an output in the form of a pressurized air signal which fluctuates between minimum and maximum values. This signal may be employed in a known manner in other fluidic circuits. A mechanical input to the signal generator is derived from a motor 12. The signal generator 10 also provides an input, through line 14 and an inlet orifice 16, to a resonator 18. The resonator 18 comprises a chamber 20, an open-ended tube 22, and a plurality of relatively small, open-ended capillary tubes 24, also projecting therefrom. The output of the phase resonator 18 is connected by line 26 to a phase discriminator 28, which also has an input line 30 connected thereto from the signal generator 10. A teaching of the manner for constructing the signal generator 10 and the phase-discriminating means 28 may be derived from copending application Ser. No. 457,099, filed May 19, 1965, now abandoned. The output of the phase discriminator means may then be fed to a transducer 32 to provide an input to a speed control 34 which, in turn, adjusts the rate of operation of the motor 12 and its input to the signal generator 10.

If the frequency of the output of the signal generator 10 is not at a desired frequency, there will be a difference of the phases of the signals fed to the phase discriminator means 28, through lines 26 and 30. This results in an output from the phase discriminator means, which through the transducer 32 and speed control 34 changes the rate of operation of motor 12 so that the frequency of the output from the signal generator is established at a desired frequency.

To more fully describe the phase relationship of the output signal from the resonator 18, the following discussion will neglect, for the moment, the effect of the tubes 24. The input signal from line 14 to the chamber 20 causes an expansion and compression of the fluid therein. When the frequency of the input signal is at the resonant frequency of the resonator, the amplitude of the fluid expansion and compression within the chamber 20 will be at a maximum and its consequent changes in pressurization will be in phase with the changes in pressurization of the input signal. This phenomenon is further explained and established by the volume of the chamber 20 and the relative dimensions of the tube 22. For any given volume and any given tube dimensions, alternate compression and expansion within the chamber, as excited by the input signal, causes what may be considered as vibration of a column of air in the tube 22. This column of air functions as a "stopper" at the resonant frequency causing a maximum compression and expansion of fluid in the chamber 20. If the input signal has a frequency below this given resonant frequency, the fluid in the chamber will be pressurized to a lesser degree and in a lagging relationship relative to the input signal. Conversely, if the input signal is greater than the given resonant frequency, the pressurization will also be reduced in magnitude but will have a leading relationship relative to the input signal. These lagging, leading and reduced magnitude effects are, of course, reflected in the output signal transmitted through the line 26.

Still neglecting the effect of the tubes 24, if the temperature of the fluid within the resonator is increased, the resonant frequency of the resonator, giving a maximum output signal, will be increased. If this should occur, the output signal would decrease in value and have a lagging relationship relative to the input signal from line 14. This would be an undesirable result, whereas in the present case it is desired to maintain the output of the signal generator 10 at a given frequency since it would cause a phase differential between the two inputs to the phase discriminator means 28 and a consequent alteration in the frequency of the output signal from the signal generator.

The tubes 24 are effective in overcoming this problem. These tubes also have vibrating columns of air therein, which function in the same fashion as the column of air in the tube 22. The combined effects of the columns of fluid in the tubes 24 and the tube 22 thus establish a resonant frequency for a chamber 20 of a given volume. The tubes 24, however, differ in character from the tube 22 in that the tube 22 offers relatively little resistance to the column of fluid vibrating therein, while the tubes 24 have a significant flow resistance characteristic. The vibrating column of air in tube 22 is relatively unaffected by changes in fluid temperature. The air columns in tubes 24 are substantially affected, by changes in fluid temperature, due to changes in viscosity and density which function to change the apparent or effective dimensions of the tubes and the mass of the air columns vibrating therein.

An increase in temperature reduces the amount of air which can be "stoppered" by given masses of air columns and consequently raises the resonant frequency of the resonator. The proper selection of the combined length, as well as the diameters of the tube 24, provides a compensating effect so that the effective reduction of the air columns therein acts to reduce the resonant frequency of the resonator. The combination of temperature effects on the chamber 20 and tubes 24 is regulated so that the resonant frequency of the resonator 18 is maintained substantially a constant over at least a relatively wide temperature range.

While it is possible to employ a single compensating tube 24, it is preferred, for compactness of design, to provide a plurality of tubes, as shown. Each tube, however, should be of sufficient length, relative to its diameter, to obtain laminar flow conditions therein so as to be effectively tempearture-responsive and thus provide the desired compensating effect. Preferably the tubes should be capillaries.

The relative dimensions of the chamber 20, tube 22, as well as the dimensions and number of the tubes 24, may be readily ascertained by those skilled in the art, in view of the teachings given herein, to obtain a resonator having a desired resonant frequency. While reference is made herein and in the claims, to air as the fluid medium, it is to be understood that other compressible fluids are equivalent to this term (air) which has been used for sake of convenience.

As will be apparent from the preceding description, the described resonator provides a temperature-insensitive reference so that the signal generator's (10) output will be maintained constant regardless of temperature variations. This also holds true for the motor 12, should it be desired to maintain its operation at a given rate. However, there are other environments where the present invention will find utility without necessarily being incorporated into such a control loop. The scope of the invention is therefore to be derived solely from the following claims.

Having thus described the invention, what is claimed as novel and desired to be secured by Letters Patent of the United States is:

1. A flueric resonator comprising:
a chamber,
means for connecting a signal to said chamber to provide an input to said resonator,
an open-ended tube, having a relatively small length-to-diameter ratio, projecting from said chamber,
open-ended, compensating tube means, characterized in that the tube means have a relatively large length-to-diameter ratio, sufficient for the rate of fluid flow therethrough to be a substantial function of the temperature of said fluid,
the relative dimensions of said chamber, tube and tube means controlling the resonant frequency of said resonator,
said resonator having an output from which is derived, a signal having maximum pressure variations when the input signal has a frequency the same as the resonant frequency of the resonator,
whereby over a given temperature range, the resonant frequency of the resonator is maintained essentially constant, due to the change in flow resistance of the compensating tube means.

2. A flueric resonator as in claim 1 wherein the compensating tube means comprise a plurality of tubes.

3. A flueric resonator as in claim 2 wherein the compensating tubes are capillaries.

4. A flueric resonator as in claim 1 further combination with a control system for maintaining a constant rate of operation of an element of said system, said system comprising:
means for generating an air signal having pressure variations therein, the rate of said pressure variations reflecting the rate of operation of said element,
said signal being connected as the input to said chamber,
means for comparing the output of said resonator and said fluid signal, and
means responsive to the output of said comparing means for adjusting the rate of operation of said element to have a fixed relationship to the resonant frequency of said resonator.

5. A combination as in claim 4 wherein the open-ended compensating tube means comprises a plurality of capillaries.

References Cited

UNITED STATES PATENTS

| | | | |
|---|---|---|---|
| 3,175,569 | 3/1965 | Sowers | 137—81.5 |
| 3,228,410 | 1/1966 | Warren et al. | 137—81.5 |
| 3,228,602 | 1/1966 | Boothe | 137—81.5 XR |
| 3,233,522 | 2/1966 | Stern | 137—81.5 XR |
| 3,275,015 | 9/1966 | Meier | 137—81.5 |
| 3,379,204 | 4/1968 | Kelley et al. | 137—81.5 |
| 3,392,739 | 7/1968 | Taplin et al. | 137—81.5 XR |
| 3,395,719 | 8/1968 | Boothe et al. | 137—36 XR |
| 3,402,727 | 9/1968 | Boothe | 137—81.5 |

SAMUEL SCOTT, Primary Examiner

U.S. Cl. X.R.

137—36